(12) United States Patent
Wolfe (10) Patent No.: US 8,814,198 B2
(45) Date of Patent: Aug. 26, 2014

(54) ADJUSTABLE TRAILER HITCH

(71) Applicant: Pat Wolfe, Lanark (CA)

(72) Inventor: Pat Wolfe, Lanark (CA)

(73) Assignee: Pat Wolfe, Lanark (CA)

( * ) Notice: Subject to any disclaimer, the term of this patent is extended or adjusted under 35 U.S.C. 154(b) by 0 days.

(21) Appl. No.: 13/771,621

(22) Filed: Feb. 20, 2013

(65) Prior Publication Data
US 2013/0341887 A1 Dec. 26, 2013

Related U.S. Application Data

(60) Provisional application No. 61/664,261, filed on Jun. 26, 2012.

(51) Int. Cl.
*B60D 1/44* (2006.01)
(52) U.S. Cl.
CPC ......................................... *B60D 1/44* (2013.01)
USPC ....................................................... 280/490.1
(58) Field of Classification Search
CPC ........................................................ B60D 1/44
USPC .................................. 280/490.1, 479.2, 479.3
See application file for complete search history.

(56) References Cited

U.S. PATENT DOCUMENTS

| | | | |
|---|---|---|---|
| 7,293,791 B1 | 11/2007 | Williams | 280/478.1 |
| 7,338,062 B1 | 3/2008 | Violette et al. | 280/478.1 |
| 7,753,393 B2 * | 7/2010 | Young | 280/477 |
| 7,850,192 B2 * | 12/2010 | Ceccarelli et al. | 280/478.1 |
| 2011/0101645 A1 * | 5/2011 | Williams et al. | 280/446.1 |
| 2011/0221164 A1 | 9/2011 | Williams et al. | 280/477 |

* cited by examiner

*Primary Examiner* — Joseph M Rocca
*Assistant Examiner* — Felicia L Brittman
(74) *Attorney, Agent, or Firm* — Teitelbaum & MacLean; Neil Teitelbaum; Doug MacLean (57) ABSTRACT

Using the trailer hitch of the present invention eliminates the need for the driver to drive back and forth several times attempting to align the trailer hitch with the socket on the trailer. The trailer hitch includes a fixed tow bar receiver, and a pivoting tow bar, which automatically locks in an extended position with the tow bar receiver, as the vehicle drives away. With other hitches, the driver must drive forward to line the trailer with the hitch, and then back up the tow vehicle to lock the hitch to prevent it from swiveling.

17 Claims, 11 Drawing Sheets

ADJUSTABLE TRAILER HITCH

CROSS-REFERENCE TO RELATED APPLICATIONS

The present invention claims priority from U.S. patent application Ser. No. 61/664,261 filed Jun. 26, 2012, which is incorporated herein by reference.

TECHNICAL FIELD

The present invention relates to a trailer hitch, and in particular to a trailer hitch with a rotating and translating tow bar for facilitating alignment with a trailer socket during hook up.

BACKGROUND OF THE INVENTION

Conventional fixed trailer hitches necessitate a second person to guide the driver or a certain amount of trial and error to ensure that the hitch is in proximity to the trailer's socket for subsequent manual connection.

Prior art swiveling trailer hitches, such as those disclosed in U.S. Pat. No. 7,293,791 issued Nov. 13, 2007 to Williams; and U.S. Pat. No. 7,338,062 issued Mar. 4, 2008 to Violette et al, and in United States Patent Applications Nos. 2011/0101645 published May 5, 2011 to Williams et al, and 2011/0221164 published Sep. 15, 2011 to Williams et al, provide telescoping and swiveling trailer hitches that facilitate the connection of the trailer hitch with the trailer socket. Unfortunately, the prior art devices are pivotable only in an extended position, and require that the driver drive forward first then back up the vehicle a precise amount to set the hitch in the locked position.

An object of the present invention is to overcome the shortcomings of the prior art by providing a rotating and translating trailer hitch that is adjustable in a retracted position, and automatically lockable when the trailer hitch is pulled into an extended position, as the vehicle pulls away, making the hitching process much easier for the driver to perform alone.

SUMMARY OF THE INVENTION

Accordingly, the present invention relates to a trailer hitch comprising:

a vehicle mount for mounting on a vehicle;

a tow bar receiver fixed to the vehicle mount, the tow bar receiver including upper and lower arms forming a gap therebetween, each of the upper and lower arms including an elongated slot extending therethrough;

a pivoting tow bar, including a vehicle hitching device for connection to a trailer, the pivoting tow bar received in the gap between the upper and lower bodies, and pivotable and slideable relative to the tow bar receiver;

a sliding pin extending through the slots in the upper and lower arms, and through the pivoting tow bar, enabling the pivoting tow bar and the sliding pin to slide from an extended position farthest away from the vehicle, towards the vehicle to one of a plurality of retracted positions, and enabling the pivoting tow bar to rotate relative to the tow bar receiver about the sliding pin; and a locking pin extendable through the tow bar receiver for engaging the pivoting tow bar in a locked position, preventing relative movement of the pivoting tow bar and the tow bar receiver, when the pivoting tow bar is in the extended position.

BRIEF DESCRIPTION OF THE DRAWINGS

The invention will be described in greater detail with reference to the accompanying drawings which represent preferred embodiments thereof, wherein.

DETAILED DESCRIPTION

With reference to FIGS. 1 to 4, a trailer hitch in accordance with the present invention includes a main tow bar 1 with a hole 2, e.g. ⅝" OD, extending laterally therethrough for receiving a pin (not shown) to secure the trailer hitch to a towing vehicle. The main tow bar 1 acts like a vehicle mount for mounting the hitch to the vehicle, and is typically comprised of a square stock of suitable size, e.g. 2"×2"×7⅝, for fitting into a vehicle's hitch receptor. The main tow bar 1 extends from a first adjustment plate 3, e.g. ⅝"×10"×6" steel, which has a plurality of holes 25, e.g. 4 to 20, extending therethrough. The holes 25 are arranged in laterally spaced-apart pairs, vertically aligned on top of each other forming a 2×N array. In the illustrated embodiment, the seven pairs of holes 25 have a ⅝" diameter and are spaced at 1¼" centers, but other suitable sizes and shapes are possible depending on the user's towing needs.

For added strength, two angle braces 6a and 6b, extending between the main tow bar 1 and the adjustment plate 3, can be provided.

Figure 1:
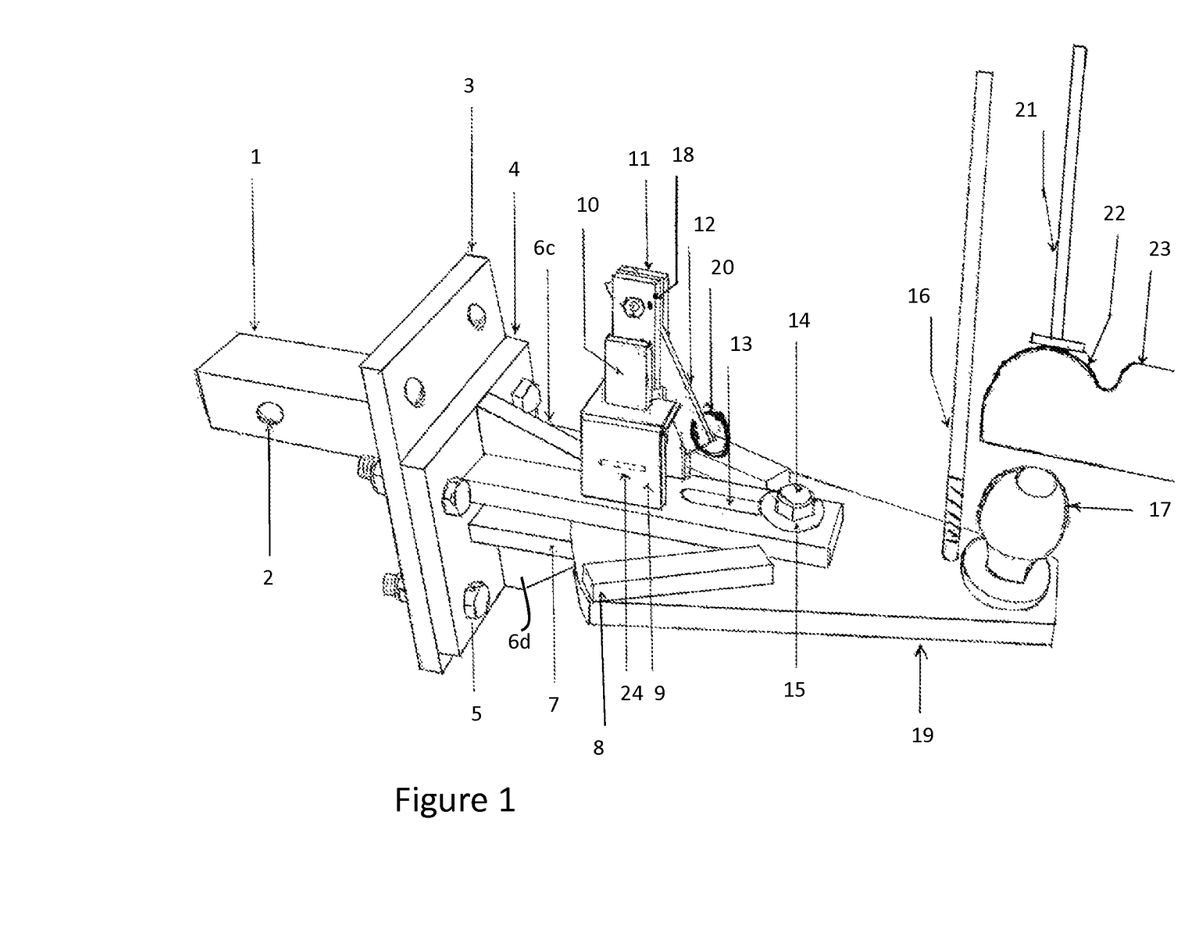
FIG. 1 is a isometric view of a trailer hitch in accordance with the present invention.
Figure 2:
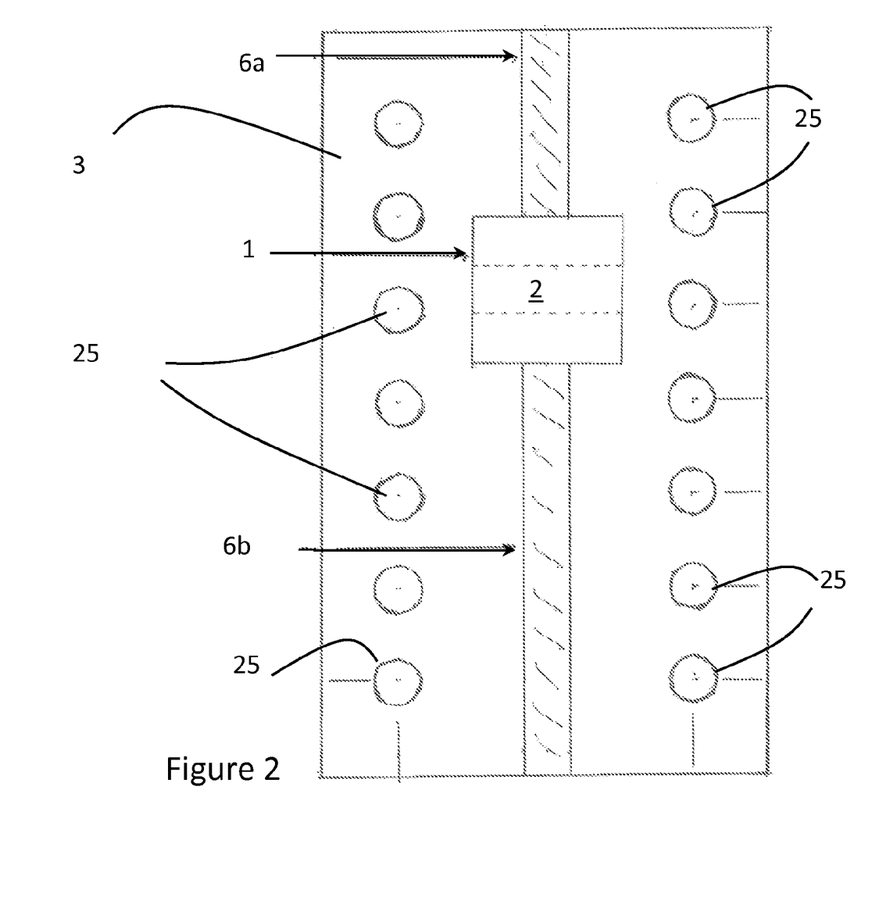
FIG. 2 is a front view of a main tow bar of the trailer hitch of FIG. 1.
Figure 3:
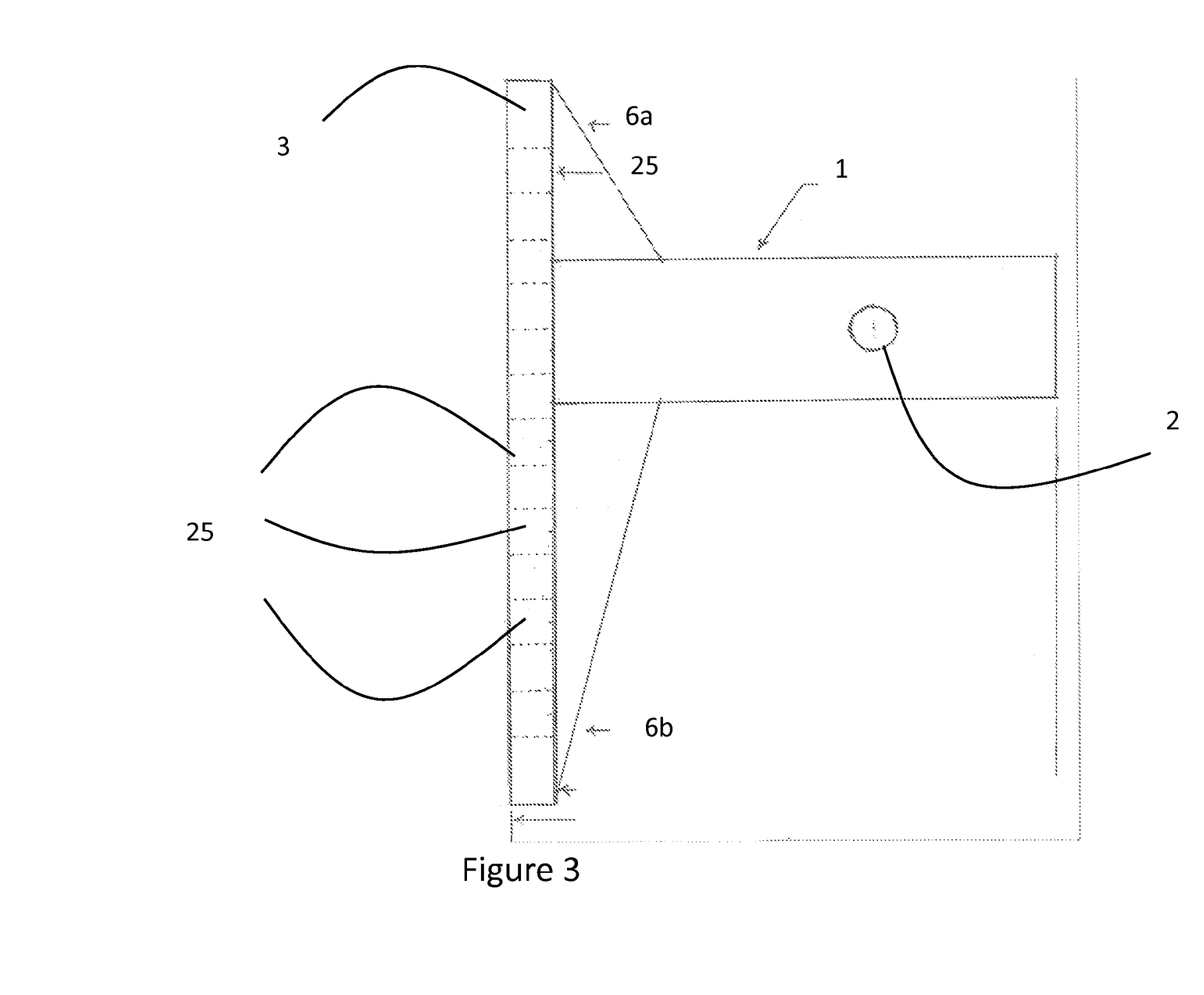
FIG. 3 is a side view of the main tow bar of FIG. 2.
Figure 4:
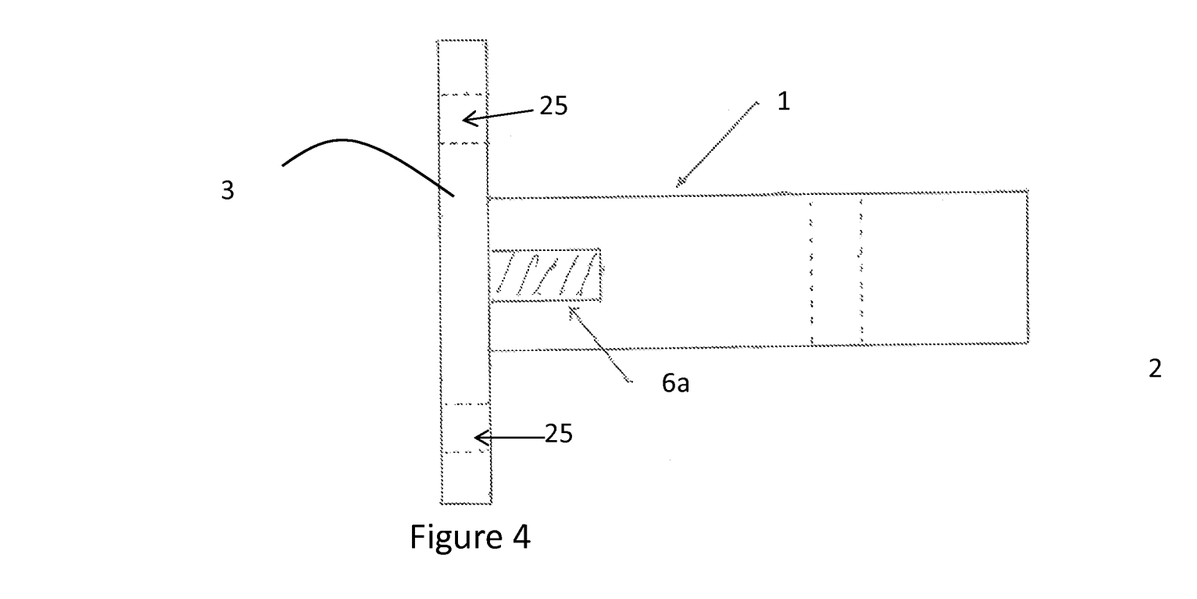
FIG. 4 is a top view of the main tow bar of FIGS. 2 and 3.
Figure 5:
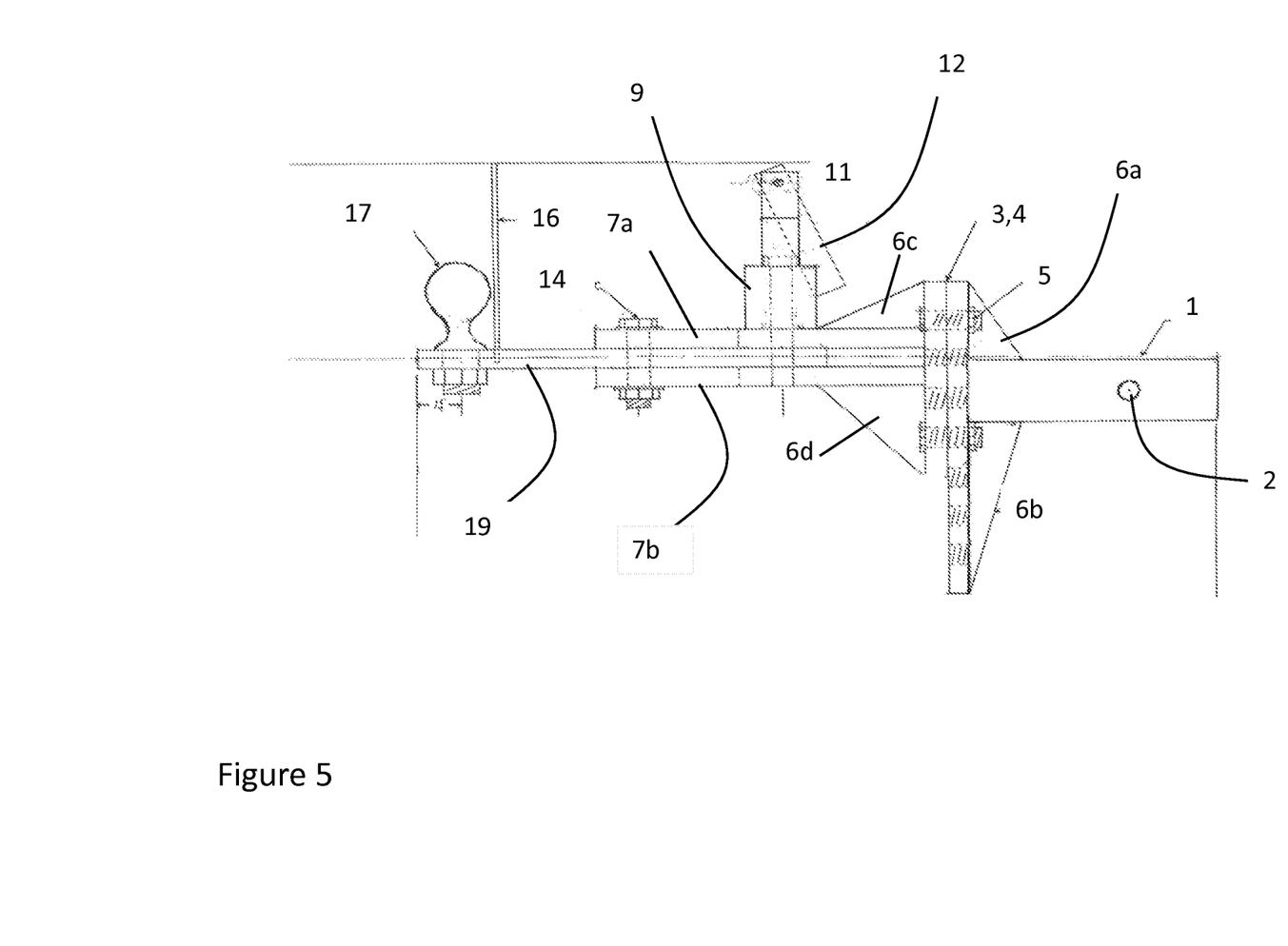
FIG. 5 is a side view of the trailer hitch of FIG. 1.

With reference to FIGS. 1 and 5, attached to the main tow bar 1 is a tow bar receiver 7. The tow bar receiver 7 includes a second adjustment plate 4 fixed to the first adjustment plate 3 using suitable mechanical fasteners, e.g. four ⅝" bolts 5, extending through holes 26 in the second adjustment plate 4 and four of the holes 25 provided in the first adjustment plate 3. The vertical height of the tow bar receiver 7 from the ground can be adjusted by sliding the second adjustment plate 4 relative to the first adjustment plate 3 and aligning the holes 26 in the second adjustment plate 4 with selected holes 25 in the first adjustment plate 3 and fastening at the desired height with the bolts 5. The first and second adjustment plates 3 and 4 can be replaced by a single mounting plate, if adjustment of the height of the tow bar 1 is not required Upper and lower spaced-apart arms or bodies, illustrated in the form of flat bars 7a and 7b, extend perpendicularly, i.e. horizontally, from the second adjustment plate 4. Each arm 7a and 7b includes a slot 13, e.g. ⅝"×2½", extending longitudinally and vertically therethrough for receiving a sliding pivot pin 14, and a hole, e.g. ⅝", for receiving a self-alignment pin 11. The illustrated upper and lower arms 7a and 7b, e.g. ⅝"×2"×9¼", are fixed, e.g. welded, to the second adjustment plate 4, e.g. ⅝"×10"×6", but other suitable structures and attachment configurations are within the scope of the invention. For extra strength, a brace 6c can be fixed, e.g. welded, between the top of the upper arm 7a and the second adjustment plate 4, and a brace 6d can be fixed, e.g. welded, between the bottom of the lower arm 7b and the second adjustment plate 4.

Figure 6:
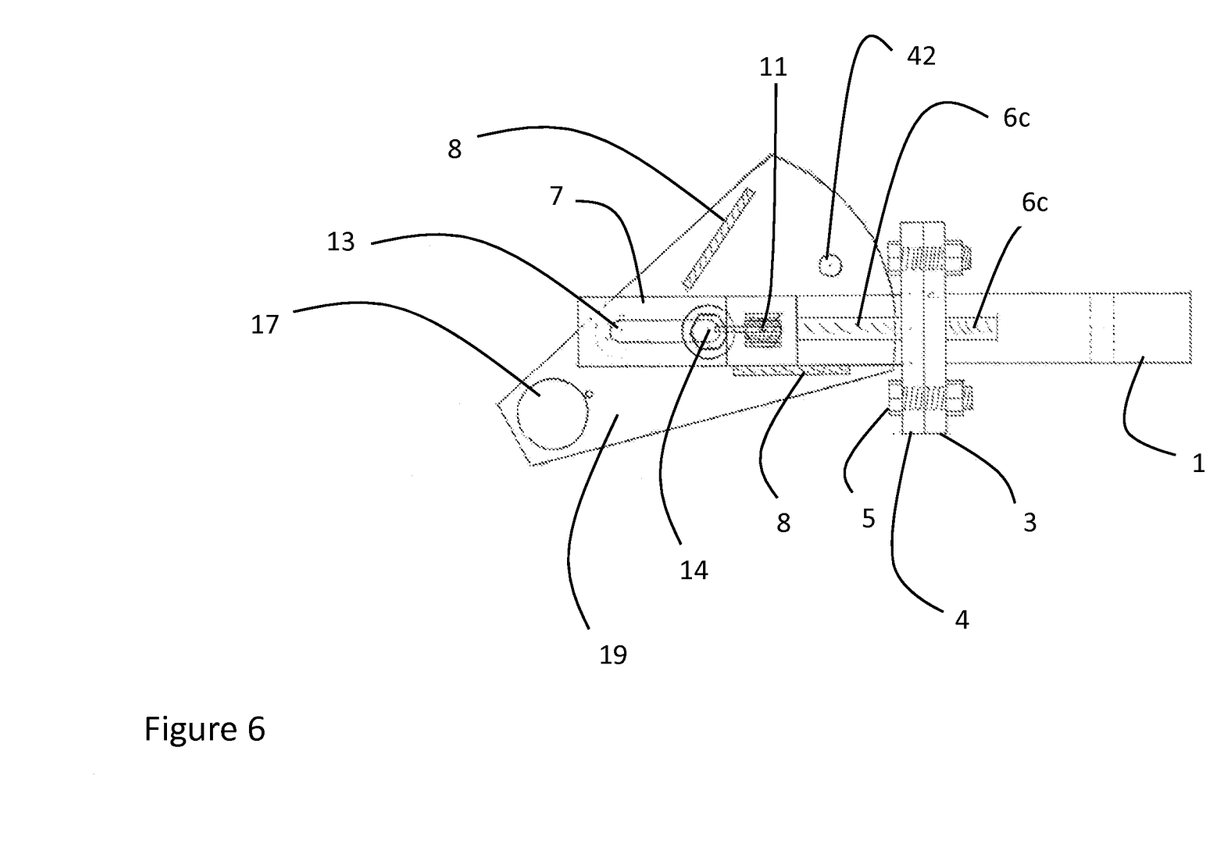
FIG. 6 is a top view of the trailer hitch of FIG. 1 in the retracted position.
Figure 7:
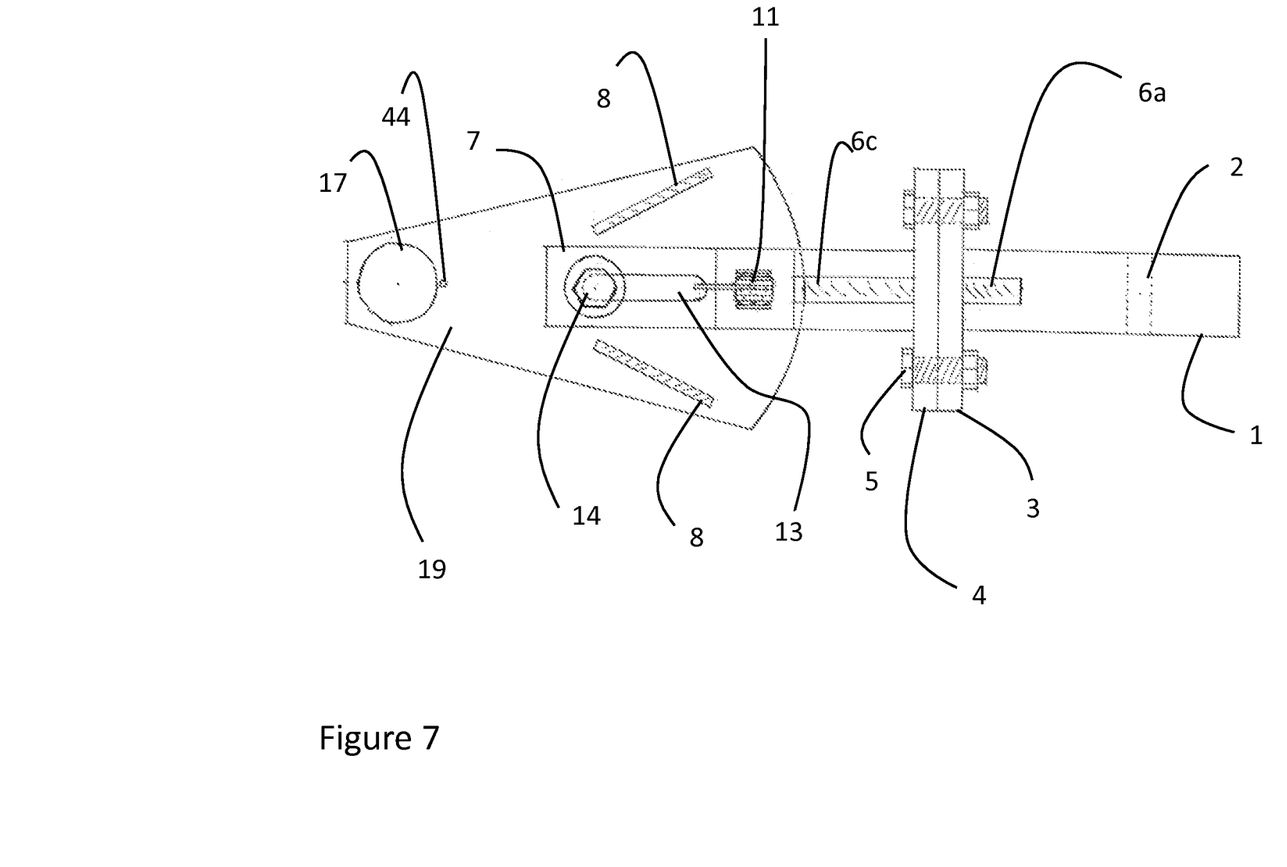
FIG. 7 is a top view of the trailer hitch of FIG. 1 in the extended position.

A pivoting tow bar 19 is pivotally and slideably mounted between the upper and lower arms 7a and 7b by the pivot pin 14, which can be in the form of a bolt with a washer 15 or any other suitable fastener. The pivot pin 14 extends vertically through the slots 13 in the arms 7a and 7b and a first hole 41 in the pivoting tow bar 19. The pivoting tow bar 19 is ideally flat stock, e.g. ⅝"×11½×7" and pie or wedged shaped. When the alignment pin 11 is disengaged, the pivoting tow bar 19 is rotatable about the pivot pin 14 and slideable relative to the upper and lower arms 7a and 7b towards the vehicle, i.e. first and second adjustment plates 3 and 4, into one of a plurality of retracted positions, as the pivot pin 14 reciprocates in the slot 13, see FIG. 6. The extended or locked position is illustrated in FIG. 7, in which the longitudinal axis of the pivoting tow bar 19 is aligned with the longitudinal axes of the upper and lower arms 7a and 7b, and the alignment pin 11 extends vertically through the pivoting tow bar 18 and the upper and lower arms 7a and 7b. In the extended or locked position, the pivot pin 14 abuts the outer end of the slots 13, and the pivoting tow bar 19 is in a position the furthest away from the vehicle.

Figure 8:
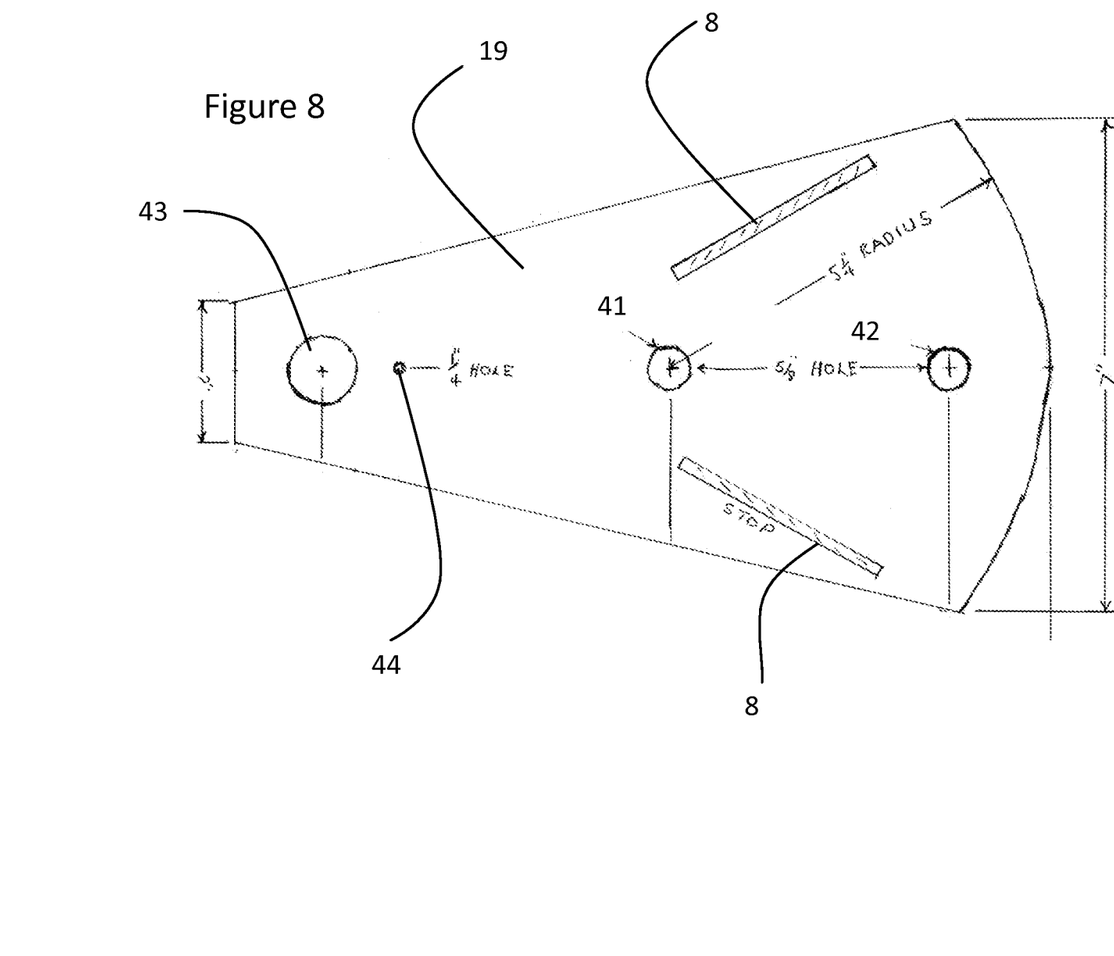
FIG. 8 is a top view of a pivoting tow bar of the trailer hitch of FIG. 1.
Figure 9:
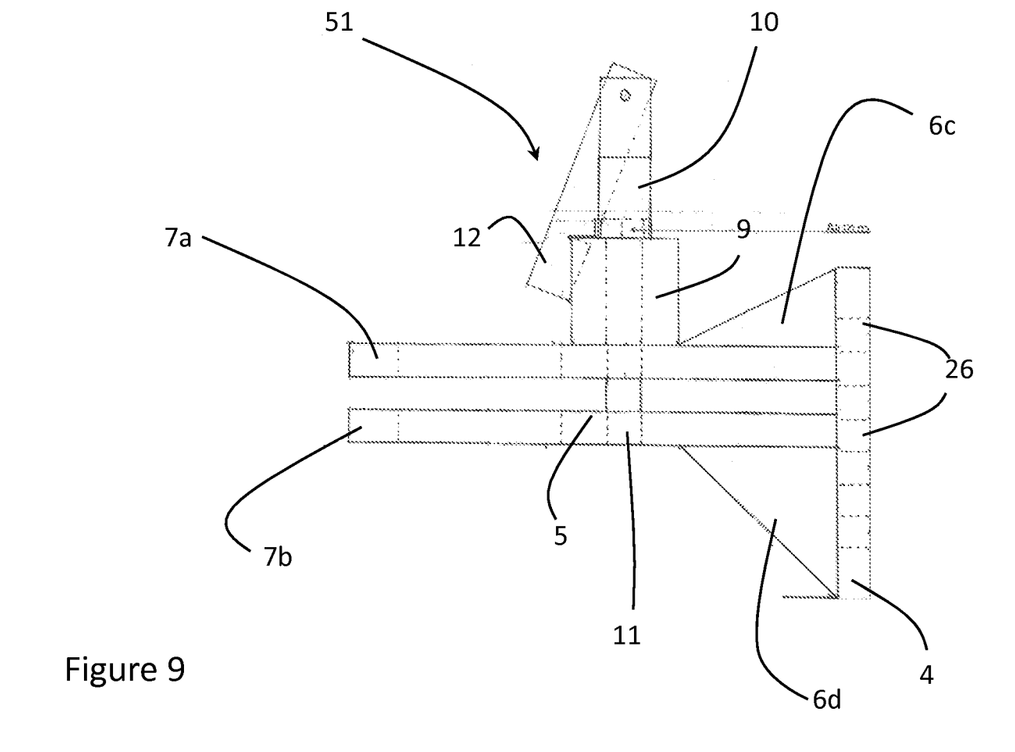
FIG. 9 is a side view of a tow bar receiver of the trailer hitch of FIG. 1.
Figure 10:
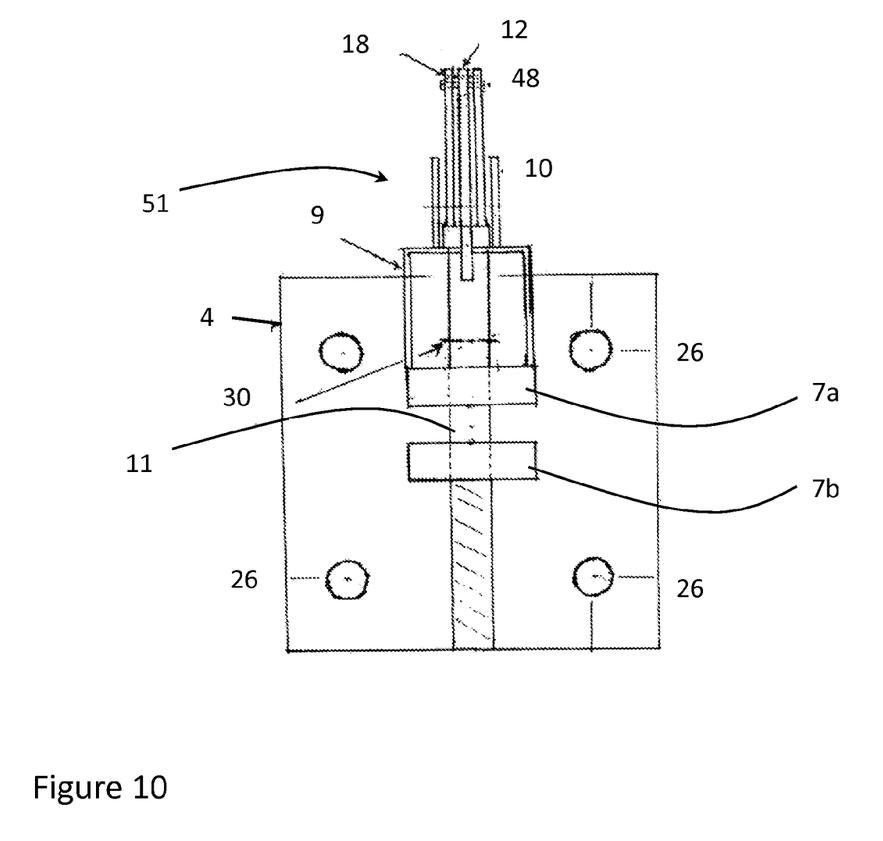
FIG. 10 is a rear view of the tow bar receiver of FIG. 9.
Figure 11:
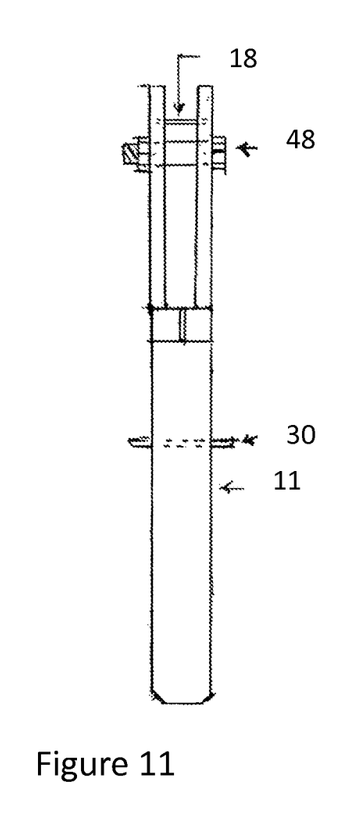
FIG. 11 is a front view of an alignment pin of the tow bar receiver of FIG. 9.
Figure 12:
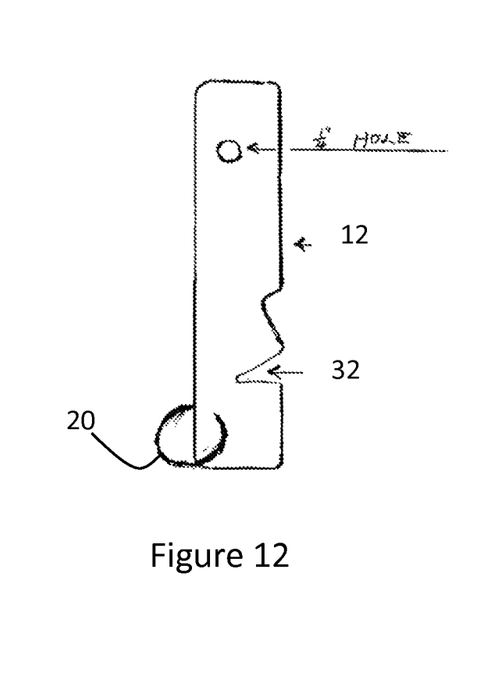
FIG. 12 is a side view of the latching mechanism of FIG. 11.

Preferably, the pivoting tow bar 19 is pie or wedge shaped, i.e. an arcuate inner end with two sides forming an acute angle therebetween with two converging sides, with a curve, e.g. 5¼" radius, from a first pivot hole 41, see FIG. 8. The pivoting tow bar 19 has two stop bars 8 fixed, e.g. welded, on to the top surface thereof. The stops 8 are mounted apart from each other at an angle of from between 30° and 90°, i.e. 15° to 45° from the center line of the swivel tow bar 19, for abutting the upper bar 7a of the tow bar receiver 7 to control the angular distance the swivel tow bar 19 can pivot. The stops 8 control the distance, e.g. 2½" left and right from the centre line, that the hitch ball 17, mounted on the swivel tow bar 19, can rotate about the pivot pin 14 relative to the tow bar receiver 7.

With reference to FIG. 8, the pivoting tow bar 19 has a series of holes extending theregthrough aligned along the longitudinal axis thereof. The first pivot hole 41 in the middle for receiving the pivot pin 14, a second locking hole 42 at the wider arcuate inner end for receiving the self-locking alignment pin 11, and a third hitch hole 43, e.g. 1", at the narrow outer end for receiving a trailer hitch ball 17. The trailer hitch ball 17 is illustrated; however, any trailer hitching device can be used. An additional fourth hole 44 can be provided proximate to the trailer hitch ball 17 to receive a spring-mounted guide rod 16, as hereinafter described, if necessary.

With reference to FIGS. 9 to 12, a self-locking alignment bolt assembly 51, including a housing 9 and an alignment pin guide 10, are fixed, e.g. welded, to the upper arm 7b of the tow bar receiver 7. The housing 9 and alignment guide 10 holds and guides the alignment pin 11, which provides an automatic or self-locking gravity-fed lock for the pivoting tow bar 19. A spring can also be provided in the housing 9 for spring biasing the alignment pin 11 into the locked position, if desired. A first stop pin 30, extending horizontally through the alignment pin 11, is provided to prevent the alignment pin 11 from being pulled out of the housing 9. The housing 9 acts as a stop for engaging the stop pin 30 at an upper limit of motion. The alignment pin 11 is equipped with a gravity-fed locking latch 12, see FIG. 12, pivotally mounted to the alignment pin 11 by latch pivot pin 48. When activated, the alignment pin 11 prevents the pivoting tow bar 19 from rotating and translating back and forth, and the self-locking latch 12 prevents the alignment pin 11 from becoming disengaged from the locked position. The locking latch 12 includes a v-cut notch 32, which fits over an edge in the housing 9 to hold the alignment pin 11 in the locked position, at the same time as the alignment pin 11 falls into place. A second latch stop pin 18 extending through the upper end of the alignment pin 11 prevents the latch 12 from rotating past vertical, i.e. maintains the latch 12 in contact with the housing 9.

To facilitate location of the hitch ball 17 in close proximity to the trailer receiver socket 22, a first guide rod 16 with a spring-loaded end is mounted on the swivel tow bar 19, just adjacent to the hitch ball 17, and a second guide rod 21, with a magnetic end, is mounted onto the trailer receiver socket 22 of the trailer 23 being towed. Both the first and second guide rods 16 and 22 extend upwardly to a height visible by a driver through the rear view mirror, e.g. 3 to 6 feet, and may include some kind of more visible indicator, e.g. ball or flag, on the upper free end. Ideally, the height of the trailer 23 is adjusted at this point so the trailer receiver socket 22 is just above the hitch ball 17. The mounted spring loaded guide rods 16 and 21 provide a significant advantage over the prior art, by allowing the driver to get the hitch ball 17 to approximately 2" from the receiver socket 22. The first guide rod 16 can be used by itself, and provides a visible indication, i.e. tilts, as it contacts the trailer arm.

During the hookup process, a driver, without the aid of a helper, can look in the rearview mirror of their vehicle, and line up the two guide rods 16 and 21, backing up until the trailer receiver socket 22 hits the spring-loaded guide rod 16. The guide rod 16 is spring-loaded so it will move without breaking providing the driver with a visual indication that the trailer receiver socket 22 is within close proximity to the hitch ball 17. The driver will stop immediately, and the trailer receiver socket 22 will be within close proximity, e.g. two inches, of the hitch ball 17. Alternative means and methods for determining whether the trailer receiver socket 22 is proximate to the hitch ball 17 are within the scope of the invention, e.g. an electronic proximity sensor, which provides a visual or audible signal when the trailer receiver socket 22 and the ball 17 are within approximately two inches of each other.

The pivoting tow bar 19 is designed so that the hitch ball 17 can move laterally from side to side, e.g. from 1.5" to 3.5" ideally 2½", and longitudinally back and forth, e.g. from 1.5" to 3.5", ideally 2½" for positioning the hitch ball 17 beneath the trailer hitch socket 22 for easy connection of the two.

To line up the hitch ball 19 under the trailer receiver socket 22, the driver will lift the gravity-fed locking bolt or pin 11 by pulling on the ring 20 that is attached to the gravity-fed locking latch 12. By pulling on the ring 20, the locking latch 12 is lifted, and the locking bolt 11 at the same time. When the locking bolt 11 is raised clear of the swivel tow bar 19, the swivel tow bar 19 can be moved back towards the vehicle into one of a plurality of retracted positions and at the same time rotated to line up the hitch ball 17 directly under the trailer receiver socket.

The driver lowers the trailer receiver socket 22 onto the hitch ball 17, secures the trailer receiver socket 22 to the hitch ball 17, returns to the tow vehicle, and drives off When the tow vehicle pulls ahead, the trailer, i.e. the arm 23 extending from the trailer, will line up in a straight line with the longitudinal axes of the pivoting tow bar 19, and the tow bar receiver 7, and the pivoting tow bar 19 will be pulled into the extended position with the pivot pin 14 abutting the end of the slots 13, enabling the gravity-fed automatic locking pin 11 to become centered over the locking hole 42 in the swivel tow bar 19. The gravity-fed automatic locking pin 11 then drops into the locking hole 42 in the pivoting tow bar 19, securing the pivoting tow bar 19 to the tow bar receiver 7, and preventing the pivoting tow bar 19 from swiveling when the trailer is in tow. When the gravity-fed automatic locking pin 11 drops into place, the gravity-fed automatic locking latch 12 also drops into place, securing the gravity-fed automatic locking pin 11 and preventing it from disengaging from the pivoting tow bar 19 while the trailer is in tow. In the illustrated embodiment, the automatic locking latch 12 is comprised of an arm pivotally connected to an end of the automatic locking pin 11, with a V-shaped notch that drops over and receives a top edge of the automatic locking bolt housing 9, thereby preventing the automatic locking pin 11 from sliding upward and disengaging the pivoting tow bar 19 and the tow bar receiver 7, i.e. holding the automatic locking pin 11 in the locked position. However, other automatic locking latches are within the scope of the invention.

The hitch in accordance with the present invention is a safe hitch because both the pivot pin 14 and the gravity-fed locking pin 11 are in tension and abutting the pivoting tow bar 17 and the first and second tow bar receiver arms 7a and 7b at the same time, thereby transmitting the force between the trailer and the vehicle by sharing the load. In other hitches, one bolt takes the full load.

I claim:

1. A trailer hitch comprising:
   a vehicle mount for mounting on a vehicle;
   a tow bar receiver fixed to the vehicle mount, the tow bar receiver including upper and lower arms forming a gap therebetween, each of the upper and lower arms including an elongated slot extending therethrough;
   a pivoting tow bar, including a vehicle hitching device for connection to a trailer, the pivoting tow bar received in the gap between the upper and lower arms, and pivotable and slideable relative to the tow bar receiver;
   a sliding pin extending through the slots in the upper and lower arms, and through the pivoting tow bar, enabling the pivoting tow bar and the sliding pin to slide from an extended position farthest away from the vehicle, towards the vehicle into one of a plurality of retracted positions, and enabling the pivoting tow bar to rotate relative to the tow bar receiver about the sliding pin in the retracted positions; and
   a locking pin extendable through the tow bar receiver for engaging the pivoting tow bar in a locked position preventing relative movement of the pivoting tow bar and the tow bar receiver, when the pivoting tow bar is in the extended position.

2. The trailer hitch according to claim 1, wherein the locking pin automatically engages the pivoting tow bar in the locked position, when the tow bar receiver and the pivoting tow bar are aligned, and the pivoting tow bar is disposed in the extended position.

3. The trailer hitch according to claim 2, wherein the locking pin is gravity fed into the locked position when the locking pin is aligned with a hole in the pivoting tow bar.

4. The trailer hitch according to claim 2, wherein the locking pin is spring biased into the locked position when the locking pin is aligned with a hole in the pivoting tow bar.

5. The trailer hitch according to claim 1, wherein the sliding pin is disposed proximate to a center of the pivoting tow bar along a longitudinal axis thereof;
   wherein the locking pin engages the pivoting tow bar at one end thereof along the longitudinal axis thereof; and
   wherein the vehicle hitching device is mounted on the pivoting tow bar at a second end thereof along the longitudinal axis.

6. The trailer hitch according to claim 5, wherein the sliding pin abuts an end of the slots in the upper and lower arms when the pivoting tow bar is in the extended position, whereby both the sliding and locking pin transmit force between the trailer and the vehicle.

7. The trailer hitch according to claim 6, wherein a hole in the pivoting tow bar for receiving the locking pin is positioned in the pivoting tow bar, whereby, in use, the locking pin automatically engages the hole in the pivoting tow bar when the pivoting to bar is in the extended position and the tow bar receiver and the pivoting tow bar are aligned with the vehicle hitching device, as the vehicle drives away.

8. The trailer hitch according to claim 1, wherein the sliding pin abuts an end of the slots in the upper and lower arms when the pivoting tow bar is in the extended position, whereby both the sliding and locking pin transmit force between the trailer and the vehicle.

9. The trailer hitch according to claim 1, wherein a hole in the pivoting tow bar for receiving the locking pin is positioned in the pivoting tow bar, whereby, in use, the locking pin automatically engages the hole in the pivoting tow bar when the pivoting tow bar is in the extended position and the tow bar receiver and the pivoting tow bar are aligned with the vehicle hitching device, as the vehicle drives away.

10. The trailer hitch according to claim 1, further comprising a locking latch for locking the locking pin in the locked position.

11. The trailer hitch according to claim 1, further comprising a locking latch for automatically locking the locking pin in the locked position.

12. The trailer hitch according to claim 1, further comprising a first guide rod extending upwardly from the pivoting tow bar for viewing by a driver of the vehicle to facilitate locating a trailer receiving socket proximate the vehicle hitching device.

13. The trailer hitch according to claim 12, wherein the first guide rod is spring-loaded enabling the first guide rod to bend, providing a visual indication of when the trailer receiving socket has contacted the first guide rod.

14. The trailer hitch according to claim 12, further comprising a second guide rod for mounting on the trailer for aligning with the first guide rod during connection of the trailer hitch to the trailer.

15. The trailer hitch according to claim 1, further comprising stops on the pivoting tow bar for engaging the tow bar receiver at outer limits of rotation of the pivoting tow bar.

16. The trailer hitch according to claim 15, wherein the stops are disposed at an angle of between 30° and 90° apart.

17. The trailer hitch according to claim 1, wherein the vehicle mount comprises a first mounting plate for mounting on the vehicle, and a second mounting plate fixed to the tow bar receiver; wherein the second mounting plate is adjustable relative to the first mounting plate for adjusting the height of the tow bar receiver.

* * * * *